No. 767,327. PATENTED AUG. 9, 1904.
D. A. CARPENTER.
MECHANICAL MOVEMENT.
APPLICATION FILED MAY 15, 1900. RENEWED DEC. 14, 1903.
NO MODEL. 2 SHEETS—SHEET 1.
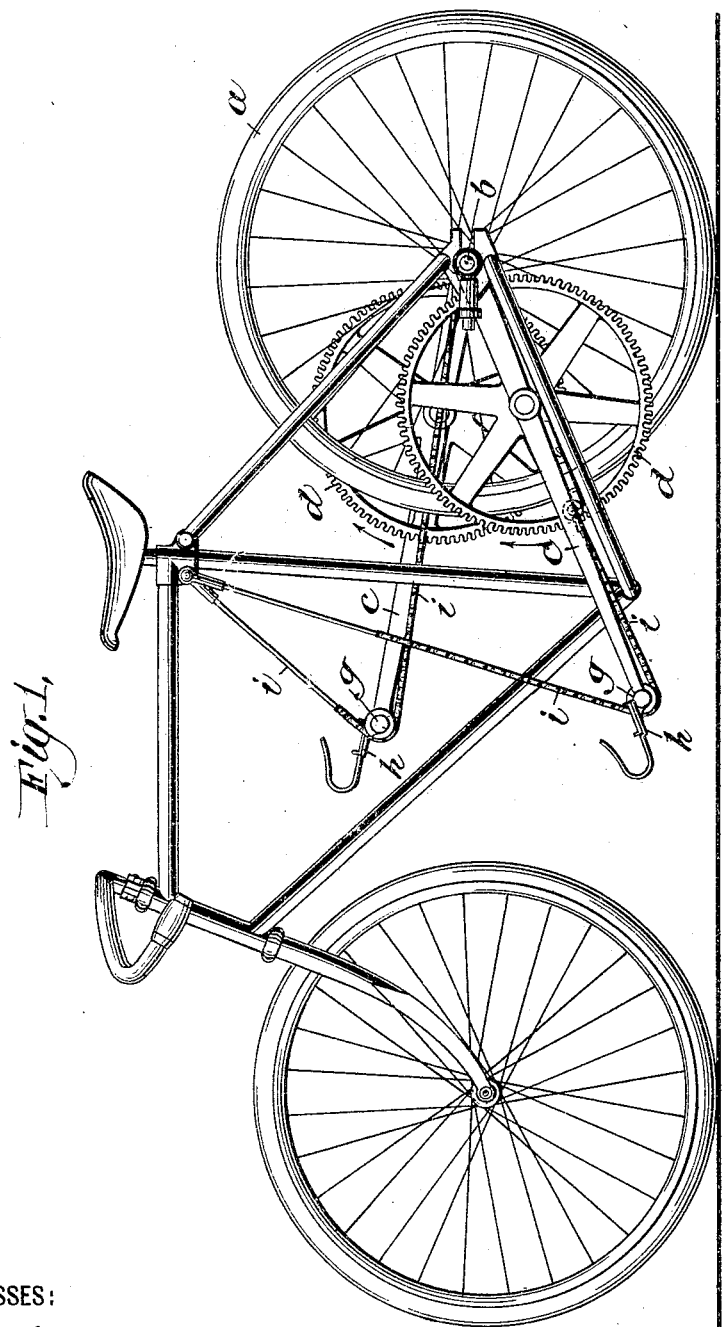
WITNESSES:
O. K. Hayword
Warren S Stutts
INVENTOR
Daniel A. Carpenter, No. 767,327. PATENTED AUG. 9, 1904.
D. A. CARPENTER.
MECHANICAL MOVEMENT.
APPLICATION FILED MAY 15, 1900. RENEWED DEC. 14, 1903.
NO MODEL. 2 SHEETS—SHEET 2.
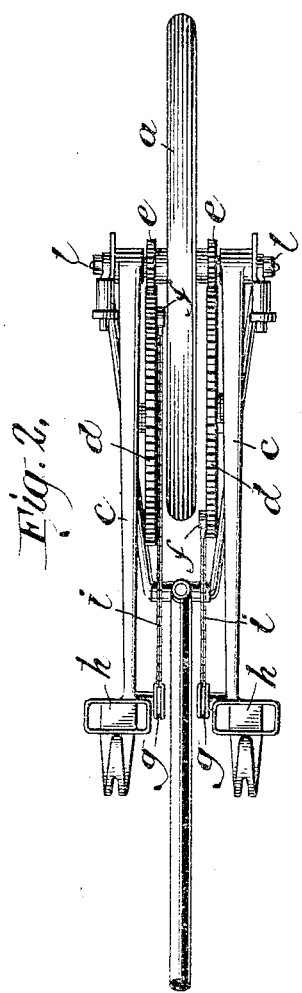
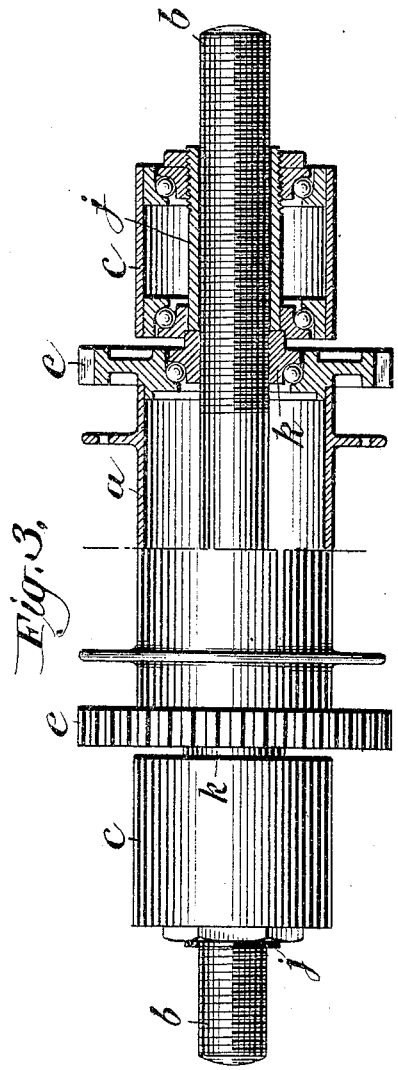
WITNESSES:
INVENTOR
Daniel A. Carpenter No. 767,327. Patented August 9, 1904.

UNITED STATES PATENT OFFICE.

DANIEL A. CARPENTER, OF NEW YORK, N. Y.

MECHANICAL MOVEMENT.

SPECIFICATION forming part of Letters Patent No. 767,327, dated August 9, 1904.

Application filed May 15, 1900. Renewed December 14, 1903. Serial No. 185,170. (No model.)

*To all whom it may concern:*

Be it known that I, DANIEL A. CARPENTER, a citizen of the United States, and a resident of the borough of Manhattan, in the county, city, and State of New York, have invented a certain new and useful Improvement in Mechanical Movements, of which the following is a full, clear, and exact description, reference being made to the accompanying drawings, forming part of this specification.

This invention relates to improvements in mechanical movements which comprise a pair of pivoted beams or levers by which power exerted thereon is utilized in producing rotary motion; and the invention consists of a machine comprising any or all of the various combinations of devices that are hereinafter described and claimed.

On the accompanying sheets of drawings, Figure 1 is a side elevation of a bicycle embodying the invention; Fig. 2, a sectional plan thereof; and Fig. 3, a partly sectional detail on an enlarged scale, showing parts of the axle and hub of the rear wheel and parts of the pivoted beams, and illustrates the construction of the bearings of the wheel and beams.

Similar reference-letters designate like parts in different views.

While the invention is shown applied to a bicycle, it is to be understood that the driving mechanism of the bicycle exhibits the invention and that the patent is intended to cover such mechanism irrespective of the character of any machine or system of mechanism in which it may be embodied and although it may constitute an independent structure.

The construction of the frame of the bicycle will be readily understood by inspecting the drawings. The rear wheel or driving-wheel $a$ is also the driving-wheel of the movement. This wheel is mounted on the shaft $b$, which is secured at its ends in the rear fork of the frame. On this shaft and on each side of the wheel $a$ is pivoted a beam $c$. Gear-wheels $d$ are mounted on these beams, and on the hub of the wheel $a$ are pinions $e$, that are engaged by the gears on the beams. On each of the gears $d$ is a crank-pin $f$, the gears and crank-pins together constituting cranks which are connected with each other by the teeth of the gears $d$, the pinions $e$, and the hub of the wheel $a$, so that if one of the cranks is turned on its axis motion is imparted from that crank to the other. Pulleys $g$ are mounted on the beams $c$ at the front end of the beams, to which are attached pedals $h$. Tugs $i$, each of which is pivotally connected at one end to the frame, pass over the pulleys $g$ and are connected by eyes with the crank-pins $f$, the parts of the tugs that make contact with the pulleys being chains, as shown, or cords, wire cables, or straps. The gears $d$ are so engaged with those on the hub of the wheel $a$ that when the front end of one of the beams is at the lower end of the arc described by it that of the other beam is held at the upper end of the arc which it describes, as appears by Figs. 1 and 2. The bearings of the wheel $a$, beams $c$, gears $d$, pulleys $g$, and those in the eyes of the tugs are ball-bearings of common construction, except that those of the beams $c$ are mounted on sleeves $j$, which are clamped on the shaft $b$ between the sides of the frame and the cones $k$ in the hub of the driving-wheel, and which coact with the shaft, frame, and nuts $l$ in locking the cones $k$ on the shaft.

The rider of the bicycle propels it by pressing the front ends of the beams downward alternately. The power applied to the beams is partly transmitted to the tugs, which act on the crank-pins $f$ and rotate the gears $d$. These gears turn in the direction indicated by the arrows in front of them and impart motion to the driving-wheel by their action on the pinions $e$, and they travel, with the beams, on arcs of circles whose centers are on the axis of the shaft $b$. When the front end of one beam is depressed, that of the other is raised by power transmitted from the crank of the descending beam to that of the rising beam through the gears and driving-wheel.

Obviously the arms of the cranks need not be incorporated in the gears $d$, but might be separate arms fastened to the axles or hubs of the gears, and for the gearing shown other gearing might be substituted—for example, sprocket wheels and chains. As the cranks may be turned in either direction by actuating the beams, motion in either direction may be imparted to the driving-wheel either through spur-gearing or chain-gearing; yet for a bicycle or any vehicle having the driving-wheel behind the operator of the movement the gearing that is regarded most desirable is the gearing shown herein, whereas for a vehicle having the driving-wheel in front of the operator it is the chain-gearing, the main reason being that for a certain power exerted on the beams the effective components of the power acting on the cranks are greater when the crank-pins are below the axes of the cranks, traveling in the direction indicated by the arrows, than when they are above those axes, traveling in the opposite direction. It will be seen, too, that the beams might be actuated by power derived from an engine, as well as by foot-power.

Having thus described my invention, what I claim as new, and desire to secure by Letters Patent, is—

1. A mechanical movement comprising the combination, with a pair of pivoted beams and a driving-wheel mounted on a common shaft between the sides of the frame to which the shaft is secured at its ends, of: wheels mounted to turn on the beams; gearing connecting those wheels with the hub of the driving-wheel; and devices that are connected with the wheels on the beams and that coact with the beams in turning those wheels; substantially as described.

2. A mechanical movement comprising the combination of: a pair of beams pivoted between the sides of a frame on a shaft which is secured at its ends to the frame; a driving-wheel mounted on the shaft between the beams; a pair of pulleys; tugs passing over the pulleys and connected with the frame and beams; and mechanism connecting the tugs with the hub of the driving-wheel; substantially as described.

3. A mechanical movement comprising the combination of: a pair of pivoted beams; a pair of pulleys mounted on the beams; a pair of cranks whose axes are nearer the pivots of the beams than are the axes of the pulleys; means to rotate each crank with power applied to the other crank; and tugs passing over the pulleys and connected with the frame and with the cranks, and constituting means that coacts with the beams in turning the cranks; substantially as described.

4. A mechanical movement comprising the combination of: a pair of pivoted beams; a pair of cranks mounted on the beams; a pair of pulleys mounted on the beams; tugs passing over the pulleys and connected with the frame and cranks, the tugs constituting means that coacts with the beams in turning the cranks; and mechanism which is actuated by the cranks and coacts with each crank in turning the other crank; substantially as described.

5. A mechanical movement comprising the combination of: a pair of pivoted beams, each mounted on a fixed axis passing through it; a pair of cranks mounted on the beams; connections that extend from the frame to the cranks, and that coact with the beams in turning the cranks; and mechanism which is actuated by the cranks and coacts with each crank in turning the other crank; substantially as described.

6. A mechanical movement comprising the combination of: a pair of pivoted beams; wheels mounted to turn on the beams; crank-pins on the wheels; connections that extend from the frame to the crank-pins, and that coact with the beams in turning the wheels; and mechanism which is actuated by the wheels and coacts with each wheel in turning the other; substantially as described.

7. A mechanical movement comprising the combination of: a pair of pivoted beams; wheels mounted to turn on the beams; crank-pins on the wheels; a pair of pulleys; tugs passing over the pulleys and connected with the crank-pins, and constituting means that coacts with the beams in turning the wheels; and mechanism which is actuated by the wheels and coacts with each wheel in turning the other; substantially as described.

8. A mechanical movement comprising the combination of: a pair of pivoted beams; wheels mounted to turn on the beams; crank-pins on the wheels; a pair of pulleys mounted on the beams; tugs passing over the pulleys and connected with the frame and crank-pins, and constituting means that coacts with the beams in turning the wheels; and mechanism which is actuated by the wheels and coacts with each wheel in turning the other; substantially as described.

9. A mechanical movement comprising the combination of: a pair of pivoted beams, each mounted on a fixed axis passing through it; a pair of cranks mounted on the beams; connections that extend from the frame to the cranks, and that coact with the beams in turning the cranks; and gearing which is actuated by the cranks and coacts with each crank in turning the other crank; substantially as described.

10. A mechanical movement comprising the combination of: a pair of pivoted beams; a pair of cranks mounted on the beams; a pair of pulleys; tugs passing over the pulleys and connected with the cranks, and constituting means that coacts with the beams in turning the cranks; and gearing which is actuated by the cranks and which coacts with each crank in turning the other crank; substantially as described.

11. A mechanical movement comprising the combination of: a pair of beams pivoted on a shaft; cranks mounted on the beams; a wheel on the shaft between the beams; gearing connecting the cranks with the hub of the wheel, the gearing comprising wheels united with the cranks on the beams; and devices that are connected with the cranks and that coact with the beams in turning the cranks; substantially as described.

12. A mechanical movement comprising the combination of: a pair of beams pivoted on a shaft; united gear-wheels and cranks having bearings on the beams; a driving-wheel on the shaft between the beams; gears on the hub of the driving-wheel, engaged by the gears on the beams; and devices that are connected with the cranks and that coact with the beams in turning the cranks; substantially as described.

13. A mechanical movement comprising the combination of: a pair of beams pivoted on a shaft; a pair of gear-wheels mounted on the beams; crank-pins fixed in these gear-wheels; a driving-wheel on the shaft between the beams; gears on the hub of the driving-wheel, engaged by the gears on the beams; a pair of pulleys; and tugs that pass over the pulleys and are connected with the crank-pins and that coact with the beams in turning the cranks; substantially as described.

14. A mechanical movement comprising the combination of: a pair of beams pivoted on a shaft; a pair of gear-wheels mounted on the beams; crank-pins fixed in these gear-wheels; a driving-wheel on the shaft between the beams; gears on the hub of the driving-wheel, engaged by the gears on the beams; pulleys on the beams; and tugs connected with the frame and crank-pins and passing over the pulleys; substantially as described.

15. A mechanical movement comprising the combination of: a pair of beams pivoted on a shaft; wheels having bearings on the beams; a driving-wheel on the shaft; gearing connecting the wheels on the beams with the driving-wheel; and devices that are connected with the wheels on the beams and that coact with the beams in turning these wheels; substantially as described.

16. A mechanical movement comprising the combination of: a pair of beams, each pivoted at one end on a fixed pin; a driving-wheel between the pivoted ends of the beams; pulleys mounted on the beams; tugs passing over the pulleys and connected with the frame; and mechanism connecting the tugs with the hub of the driving-wheel; the frame being that of a velocipede and the tugs being connected with the frame above, and behind the front ends of, the beams; substantially as described.

17. A mechanical movement comprising the combination of: a pair of beams, each pivoted at one end on a shaft; a driving-wheel on the shaft between the beams; a pair of pulleys; tugs passing over the pulleys and connected with the frame and beams; and mechanism connecting the tugs with the hub of the driving-wheel; the frame being that of a velocipede and the tugs being connected with the frame above, and behind the front ends of, the beams; substantially as described.

18. A mechanical movement comprising the combination of: a pair of beams $c$ pivoted on a shaft $b$; a driving-wheel mounted on the shaft between the beams; gearing mounted on the beams and the hub of the driving-wheel; a pair of pulleys mounted on the beams; and tugs passing over the pulleys and connected with the frame and with the gearing; substantially as described.

19. A mechanical movement comprising the combination of a pivoted beam, a crank, and a flexible tug, the beam having a pulley secured to it, and the axis of the crank being nearer the pivot of the beam than is the pulley, and the tug passing over the pulley and being connected with a fixed pin and with the crank-pin, substantially as described.

20. A mechanical movement comprising the combination of a pivoted beam, a crank, and a flexible tug, the beam having a pulley secured to it, the crank being mounted on the beam, and the tug passing over the pulley and being connected with a fixed pin and with the crank-pin, substantially as described.

21. A mechanical movement comprising the combination of a pivoted beam, a crank, a pulley, and a flexible tug, the crank being mounted on the beam, and the tug passing over the pulley and being connected with the crank-pin and constituting means to coact with the beam and pulley in turning the crank, subtantially as described.

22. A mechanical movement comprising the combination of a pivoted beam, a crank mounted on the beam, and a connecting device extending from the crank-pin to a fixed pin and properly arranged to coact with the beam in turning the crank, substantially as described.

23. A mechanical movement comprising the combination of: a pivoted beam; gearing comprising a united wheel and crank, mounted on the beam, and another wheel mounted on the pivotal axis of the beam; and a connecting device extending from the crank-pin to a fixed pin and properly arranged to coact with the beam in turning the crank; substantially as described.

24. A mechanical movement comprising the combination of: a beam pivoted on a fixed axis passing through it, and having a movement back and forth through only a part of a revolution on its axis; gearing comprising a wheel mounted to turn on the beam and another wheel mounted on the pivotal axis of the beam; and means to coact with the beam and gearing in imparting a continuous rotary motion to the wheel on the beam, said means being operated by force applied to the beam; subtantially as described.

DANIEL A. CARPENTER.

In presence of—
WARREN S. STUTTS,
WM. W. SHAW.